United States Patent
Lee et al.

(10) Patent No.: US 8,750,270 B2
(45) Date of Patent: Jun. 10, 2014

(54) METHOD AND APPARATUS FOR TRANSMITTING FEEDBACK REQUEST AND METHOD AND APPARATUS FOR RECEIVING FEEDBACK REQUEST IN WIRELESS COMMUNICATION SYSTEM

(75) Inventors: Wook Bong Lee, Anyang-si (KR); Bin Chul Ihm, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 13/028,174

(22) Filed: Feb. 15, 2011

(65) Prior Publication Data

US 2011/0206024 A1    Aug. 25, 2011

Related U.S. Application Data

(60) Provisional application No. 61/307,849, filed on Feb. 25, 2010.

(30) Foreign Application Priority Data

Jan. 18, 2011   (KR) .................. 10-2011-0004921

(51) Int. Cl.
*H04L 1/12*   (2006.01)
*H04L 1/00*   (2006.01)
*H04L 1/16*   (2006.01)

(52) U.S. Cl.
CPC .............. *H04L 1/003* (2013.01); *H04L 1/0029* (2013.01); *H04L 1/1614* (2013.01)
USPC ......... 370/338; 370/328; 455/450; 455/452.2

(58) Field of Classification Search
USPC ........................................ 370/338
See application file for complete search history.

(56) References Cited

U.S. PATENT DOCUMENTS

| 7,283,499 | B2   | 10/2007 | Priotti et al. |
|---|---|---|---|
| 7,869,402 | B2 * | 1/2011  | Yoon et al. ..................... 370/329 |
| 2005/0052991 | A1 * | 3/2005  | Kadous .......................... 370/216 |
| 2008/0089281 | A1   | 4/2008  | Yoon et al. |

(Continued)

FOREIGN PATENT DOCUMENTS

| CN | 101142774 | 3/2008 |
|---|---|---|
| CN | 101595693 | 12/2009 |

OTHER PUBLICATIONS

Mazzarese et al., "Proposal for MIMO feedback modes", IEEE C80216m-09/1046r1, Apr. 27, 2009.*

(Continued)

*Primary Examiner* — Hanh N Nguyen
*Assistant Examiner* — Joshua A Kading
(74) *Attorney, Agent, or Firm* — Lee, Hong, Degerman, Kang & Waimey

(57) ABSTRACT

A method for transmitting a feedback request in a wireless communication system is provided. The method includes: transmitting feedback request control information to a user equipment (UE), wherein the feedback request control information includes a MIMO (Multi-Input Multi-Output) feedback bitmap indicating at least one MIMO feedback mode to be applied to the UE and a common parameter, and the common parameter comprises a parameter commonly requested for the UE to generate feedback information in the at least one MIMO feedback mode.

10 Claims, 6 Drawing Sheets

(56) References Cited

U.S. PATENT DOCUMENTS

| | | | |
|---|---|---|---|
| 2008/0207151 A1* | 8/2008 | Rinne et al. | 455/140 |
| 2009/0034636 A1* | 2/2009 | Kotecha et al. | 375/260 |
| 2009/0034639 A1* | 2/2009 | Hwang et al. | 375/260 |
| 2009/0086648 A1* | 4/2009 | Xu et al. | 370/252 |
| 2009/0154588 A1* | 6/2009 | Chen et al. | 375/267 |
| 2010/0075672 A1* | 3/2010 | Jwa et al. | 455/434 |
| 2011/0141926 A1* | 6/2011 | Damnjanovic et al. | 370/252 |

OTHER PUBLICATIONS

Mazzarese et al., "Proposed changes to the feedback polling A-MAP IE (16.3.6)", IEEE C802.16m-09/2799r3, Dec. 31, 2009.*

The State Intellectual Property Office of the People's Republic of China Application No. 201110049774.X, Office Action dated Jun. 5, 2013, 7 pages.

Taiwan Intellectual Property Office Application Serial No. 100106463, Office Action dated Aug. 26, 2013, 7 pages.

* cited by examiner

METHOD AND APPARATUS FOR TRANSMITTING FEEDBACK REQUEST AND METHOD AND APPARATUS FOR RECEIVING FEEDBACK REQUEST IN WIRELESS COMMUNICATION SYSTEM

CROSS-REFERENCE TO RELATED APPLICATIONS

Pursuant to 35 U.S.C. §119, this application claims the benefit of earlier filing date and right of priority to Korean Application No. 10-2011-0004921, filed on Jan. 18, 2011, and also claims the benefit of U.S. Provisional Application Ser. No. 61/307,849, filed on Feb. 25, 2010, the contents of which are all hereby incorporated by reference herein in their entirety.

BACKGROUND

1. Technical Field

The present invention relates to wireless communication and, more particularly, to a method and apparatus for transmitting a feedback request and a method and apparatus for receiving a feedback request in a wireless communication system.

2. Related Art

IEEE (Institute of Electrical and Electronics Engineers) 802.16e standards have been adapted in the name of 'WMAN-OFDMA TDD' as sixth standards for IMT (International Mobile Telecommunication)-2000 in ITU (International Telecommunication Union) affiliated ITU-R (ITU-Radio communication sector) in 2007. ITU-R is preparing an IMT-Advanced system as next-generation 4G mobile communication standards after IMT-2000. IEEE 802.16 WG (Working Group) has determined to promote an 802.16m project to aim at creating amendment standards of the existing IEEE 802.16e, as standards for the IMT-Advanced system in late 2006. As noted from the aim, 802.16m standards involve the continuity of the past 802.16e standards and the continuity of the futuristic next-generation IMT-Advanced system. Thus, 802.16m standards are required to satisfy the advanced requirements for the IMT-Advanced system while maintaining the compatibility with the 802.16e standard-based Mobile WiMAX system.

A MIMO (Multiple Input Multiple Output) may be considered as a technique for supporting a reliable high speed data service. The MIMO technique improves data transmission and reception efficiency by using multiple transmission antennas and multiple reception antennas. The MIMO technique includes spatial multiplexing, transmit diversity, beamforming, or the like. A MIMO channel matrix according to the number of reception antennas and transmission antennas can be disassembled into a plurality of independent channels. Each independent channel is called layer or stream. The number of layers is called rank.

A user equipment (UE) may transmit feedback through uplink. The feedback may include channel information required for a data transmission. A base station (BS) may schedule radio resources by using the feedback received from the UE, and transmit data. A closed loop scheme is transmitting data by compensating for channel information included in the feedback from the UE, and an open loop scheme is transmitting data without compensating for channel information included in the feedback from the UE. The feedback may not be transmitted in the open loop scheme, and if ever, the BS may not use the channel information included in the feedback. In general, in a wireless communication system, the open loop scheme may be applied in a channel environment for a UE moving at a high speed, and the closed loop scheme may be applied in a channel environment for a UE moving at a low speed. Because the channel for the UE moving at a high speed severely changes, channel information included in feedback is not reliable, so the open loop scheme is employed. The channel environment for the UE moving at a low speed does not greatly change relatively, so the channel information included in feedback is reliable and less vulnerable to delay, so the closed loop scheme can be employed.

The BS transmits a feedback request, and the UE transmits appropriate feedback information to the BS by using control information included in the feedback request. For example, in IEEE 802.16, the BS transmits a feedback request called feedback polling A-MAP IE. Such a feedback request is generally transmitted by a limited number of bits. However, it may happen that the conventional feedback polling A-MAP IE stipulated in IEEE 802.16 may include a number of bits exceeding the limited number of bits.

Thus, a method and apparatus for reducing overhead without exceeding the limited number of bits when the BS transmits a feedback request are required.

SUMMARY

An object of the present invention is to provide a method for transmitting a feedback request and a method and apparatus for receiving a feedback request in a wireless communication system.

According to an aspect of the present invention, there is provided a method for transmitting a feedback request in a wireless communication system, including: transmitting feedback request control information to a user equipment (UE), wherein the feedback request control information includes a MIMO (Multi-Input Multi-Output) feedback bitmap indicating at least one MIMO feedback mode to be applied to the UE and a common parameter, and the common parameter comprises a parameter commonly requested for the UE to generate feedback information in the at least one MIMO feedback mode.

When channel status information based on a subband is transmitted in the MIMO feedback mode, the common parameter may be a parameter indicating the number of subbands as targets for generating the channel status information.

When the MIMO feedback mode is a closed loop feedback mode, the common parameter may include parameters indicating a codebook for selecting a PMI to be fed back by the UE.

The feedback request control information may be unicast to the UE.

The MIMO feedback bitmap may be composed of 8 bits.

The feedback request control information may include 16-bit cyclic redundancy check (CRC).

According to another aspect of the present invention, there is provided a method for receiving a feedback request of a user equipment (UE) in a wireless communication system, including: receiving feedback request control information from a base station (BS); and transmitting feedback information to the BS based on the feedback request control information, wherein the feedback request control information includes a MIMO (Multi-Input Multi-Output) feedback bitmap indicating at least one MIMO feedback mode to be applied to the UE and a common parameter, and the common parameter comprises a parameter commonly requested for the UE to generate feedback information in the at least one MIMO feedback mode.

When channel status information based on a subband is transmitted in the MIMO feedback mode, the common parameter may be a parameter indicating the number of subbands as targets for generating the channel status information.

When the MIMO feedback mode is a closed loop feedback mode, the common parameter may include parameters indicating a codebook for selecting a PMI to be fed back by the UE.

The feedback request control information may be unicast from the BS to the UE.

The MIMO feedback bitmap may be composed of 8 bits.

The feedback request control information may include 16-bit cyclic redundancy check (CRC).

According to still another aspect of the present invention, there is provided an apparatus for transmitting a feedback request in a wireless communication system, including: an RF unit configured to transmit and receive a radio signal; and a processor connected to the RF unit, wherein the processor generates feedback request control information, and the feedback request control information includes a MIMO (Multi-Input Multi-Output) feedback bitmap indicating at least one MIMO feedback mode to be applied to the UE and a common parameter, and the common parameter comprises a parameter commonly requested for the UE to generate feedback information in the at least one MIMO feedback mode.

When channel status information based on a subband is transmitted in the MIMO feedback mode, the common parameter may be a parameter indicating the number of subbands as targets for generating the channel status information.

When the MIMO feedback mode is a closed loop feedback mode, the common parameter may include parameters indicating a codebook for selecting a PMI to be fed back by the UE.

DESCRIPTION OF EXEMPLARY EMBODIMENTS

The following technique may be used for various wireless communication systems such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for Mobile communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. IEEE 802.16m is an advancement of IEEE 802.16e, providing backward compatibility with an IEEE 802.16e-based system. UTRA is a part of UMTS (Universal Mobile Telecommunications System). 3GPP (3rd Generation Partnership Project) LTE (long term evolution) is part of E-UMTS (Evolved UMTS) using E-UTRA, which employs OFDMA for downlink and SC-FDMA for uplink. LTE-A (Advanced) is an advancement of 3GPP LTE.

To clarify the explanation, description will be made largely based on the IEEE 802.16m, but the technical concept of the present invention is not limited thereto.

Figure 1:
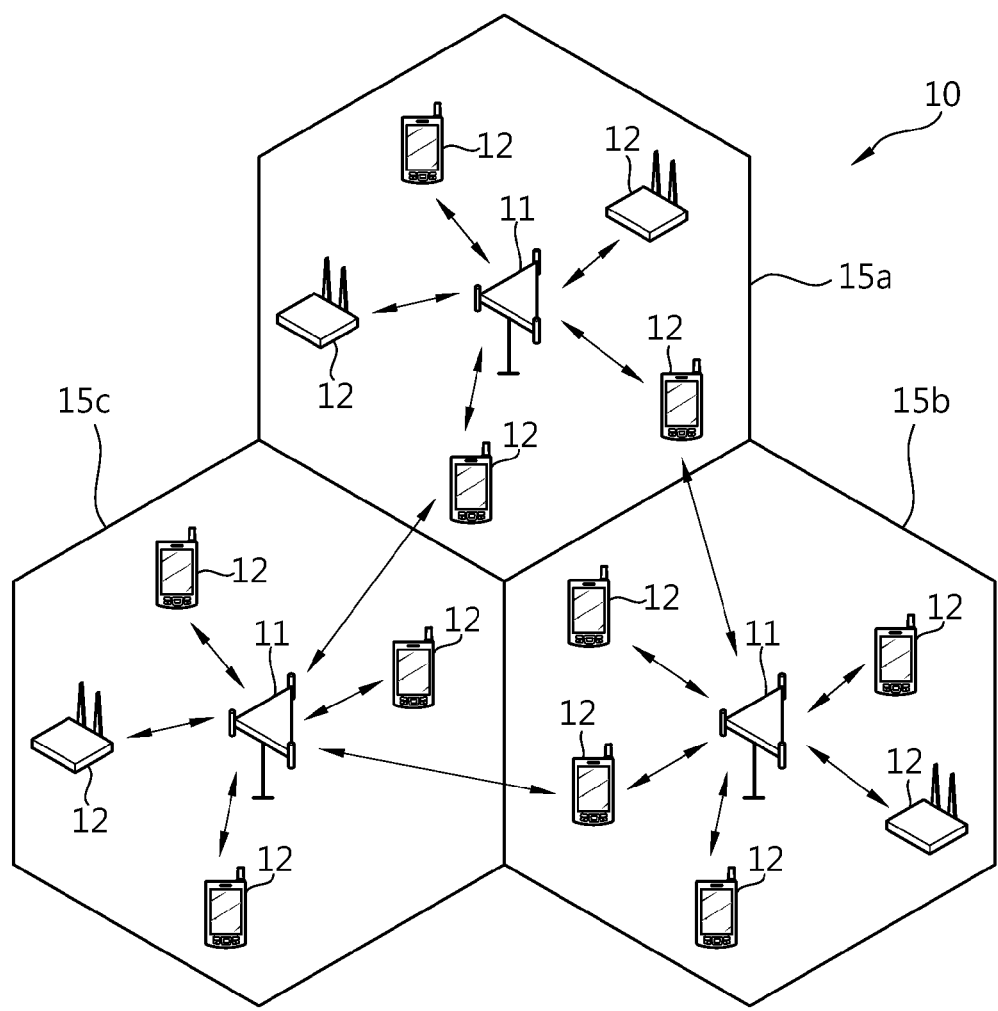
FIG. 1 illustrates a wireless communication system.

FIG. 1 illustrates a wireless communication system.

Referring to FIG. 1, the wireless communication system 10 includes at least one base station (BS) 11. Each BS 11 provides a communication service to particular geographical areas (which are generally called cells) 15a, 15b, and 15c. Each of the cells may be divided into a plurality of areas (sectors). A user equipment (UE) 12 may be fixed or mobile and may be called by other terminologies such as mobile station (MS), mobile terminal (MT), user terminal (UT), subscriber station (SS), wireless device, personal digital assistant (PDA), wireless modem, handheld device, etc. The BS 11 generally refers to a fixed station that communicates with the UE 12 and may be called by other terminologies such as evolved-nodeB (eNB), base transceiver system (BTS), access point (AP), etc.

A UE belongs to a cell, and the cell to which the UE belongs is called a serving cell. A BS providing a communication service to the serving cell is called a serving BS. The wireless communication system is a cellular system, so there may exist a different cell adjacent to the serving cell. The different cell adjacent to the serving cell is called a neighbor cell. A BS providing a communication service to the neighbor cell is called a neighbor BS. The serving cell and the neighbor cell are relatively determined based on the UE.

The technique may be used for downlink or uplink. In general, downlink refers to communication from the BS 11 to the UE 12, and uplink refers to communication from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

Figure 2:
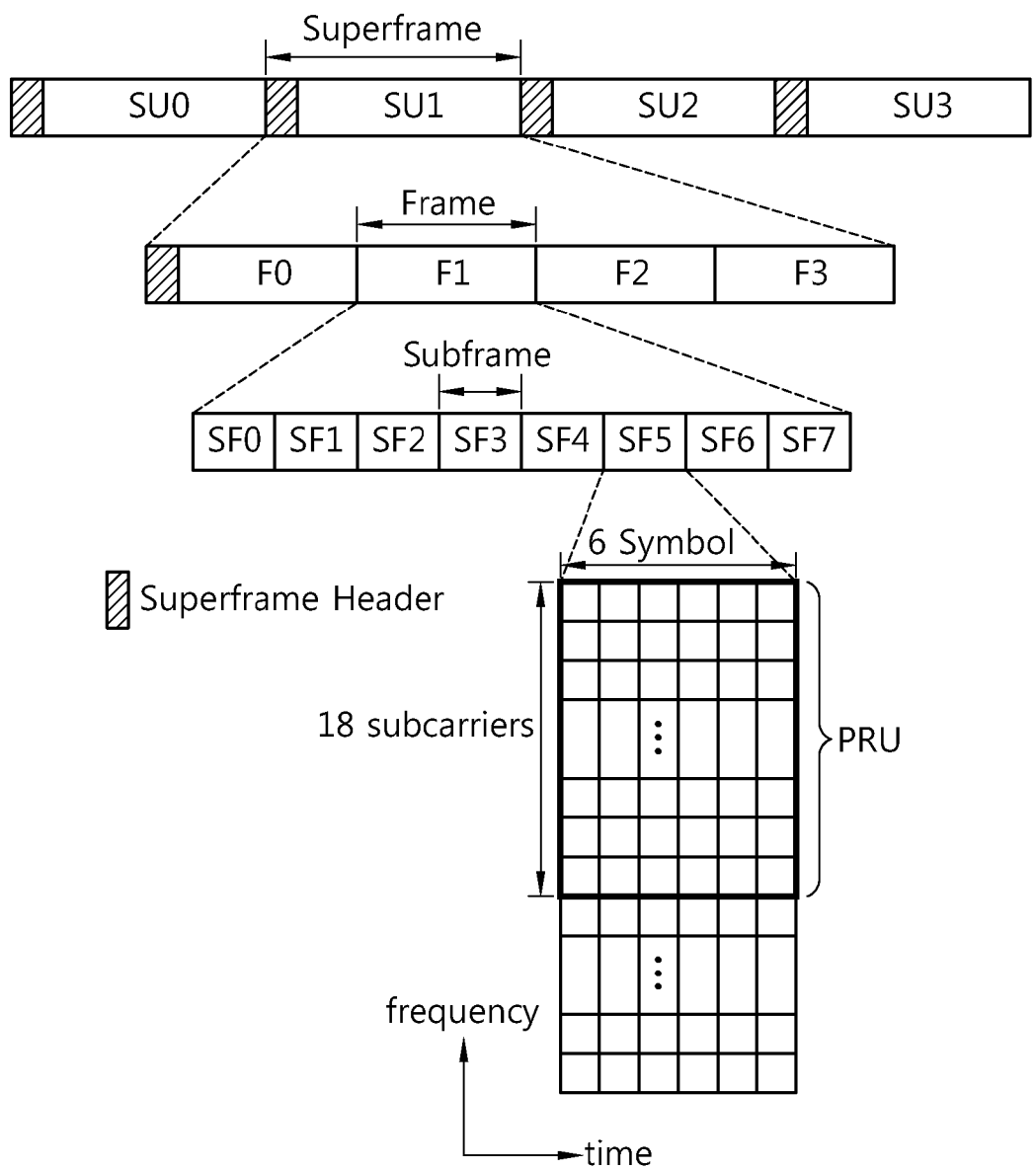
FIG. 2 illustrates an example of the structure of a superframe.

FIG. 2 illustrates an example of the structure of a superframe.

With reference to FIG. 2, a superframe (SF) includes a superframe header (SFH) and four frames (F0, F1, F2, and F3). The lengths of the respective frames within the superframe may be equal. It is illustrated that each superframe has a size of 20 ms and each frame has a size of 5 ms, but the present invention is limited thereto. The length of the superframe, the number of frames included in the superframe, and the number of subframes included in each frame may be variably changed. The number of subframes included in each frame may be changed variably depending on a channel bandwidth and the length of a cyclic prefix (CP).

One frame includes a plurality of subframes SF0, SF1, SF2, SF3, SF4, SF5, SF6, and SF7. Each subframe may be used for an uplink or downlink transmission. One subframe includes a plurality of OFDM (orthogonal frequency division multiplexing) symbols or OFDMA (orthogonal frequency division multiple access) symbols in a time domain, and includes a plurality of subcarriers in a frequency domain. The OFDM symbol is to express one symbol period and may be called by other terminologies such as OFDMA symbol, SC-FDMA symbol, and the like, according to a multi-access scheme. A subframe may include five, six, seven, or nine OFDM symbols, but this is merely illustrative and the number of OFDM symbols included in a subframe is not limited thereto. The number of OFDM symbols included in a subframe may be changed variably according to a channel bandwidth and a CP length. The type of a subframe may be defined according to the number of OFDMA symbols included in a subframe. For example, a type-1 subframe may be defined to include six OFDMA symbols, a type-2 subframe may be defined to include seven OFDMA symbols, a type-3 subframe may be defined to include five OFDMA symbols, and a type-4 subframe may be defined to include nine OFDMA symbols. One frame may include the same type of subframes. Or, one frame may include different types of subframes. That is, the number of OFDMA symbols included in each subframe of one frame may be the same or different. Or, the number of OFDMA symbols of at least one subframe in one frame may be different from the number of OFDM symbols included in the other remaining subframes in the frame.

A TDD (Time Division Duplexing) scheme or an FDD (Frequency Division Duplexing) scheme may be applied to a frame. In the TDD scheme, each frame is used for an uplink transmission or a downlink transmission at a different time at the same frequency. Namely, subframes in a frame according to the TDD scheme are divided into uplink subframes and downlink subframes in a time domain. A switching point refers to a point at which a transmission direction changes from an uplink to a downlink or from a downlink to an uplink, and the number of switching points in each frame according to the TDD scheme may be 2. In the FDD scheme, the respective subframes are used for an uplink transmission or downlink transmission at different frequencies of the same time. Namely, subframes in a frame according to the FDD scheme are divided into uplink subframes and downlink subframes in a frequency domain. The uplink transmission and the downlink transmission may occupy different frequency bands and may be simultaneously performed.

A superframe header (SFH) may carry an essential system parameter and a system configuration information. The SFH may be positioned in a first subframe in the superframe. The SFH may occupy the last five OFDMA symbols of the first subframe. The SFH may be classified into a primary SFH (P-SFH) and a secondary SFH (S-SFH). The P-SFH and the S-SFH may be transmitted at every superframe. The S-SFH may be transmitted in two contiguous superframes. Information transmitted in the S-SFH may be divided into three sub-packets of S-SFH SP1, S-SFH SP2, and S-SFH SP3. Each subpacket may be periodically transmitted by different periods. The importance of information transmitted through the S-SFH SP1, S-SFH SP2, and S-SFH SP3 may be different, and the S-SFH SP1 may be transmitted for the shortest period, and the S-SFH SP3 may be transmitted for the longest period. The S-SFH SP1 includes information regarding a network re-entry. The S-SPH SP2 includes information regarding an initial network entry and a network discovery. The S-SPH SP3 includes the other remaining important system information.

Figure 3:
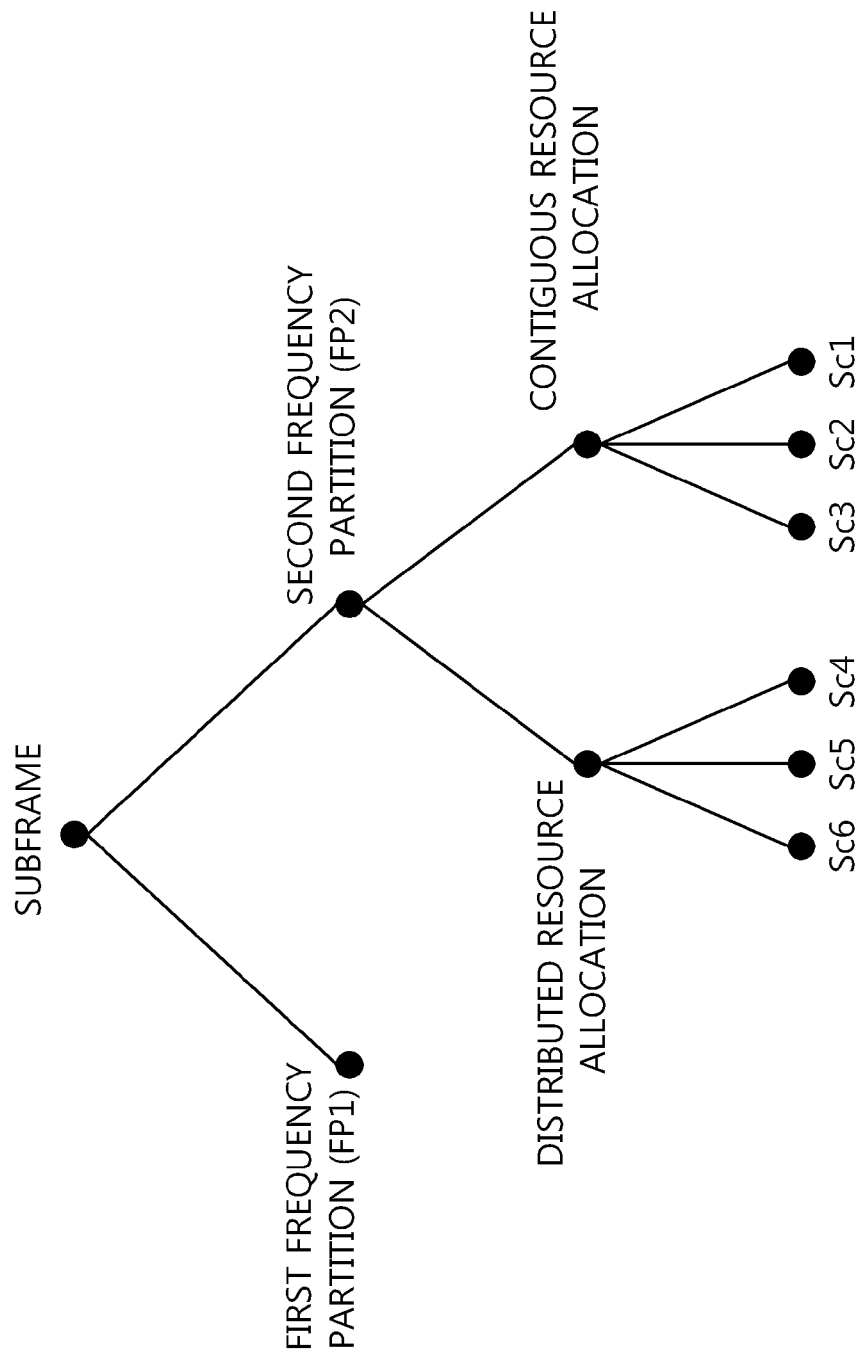
FIG. 3 illustrates an example of an uplink resource structure.

FIG. 3 illustrates an example of an uplink resource structure.

Each uplink subframe may be divided into at least one frequency partition (FP). FIG. 3 shows the case in which a subframe is divided into two frequency partitions FP1 and FP2, but the number of frequency partitions in the subframe is not limited thereto. The number of frequency partitions may be a maximum of 4. Each frequency partition includes at least one physical resource unit (PRU) over the entire OFDMA symbols available in a subframe. Also, each frequency partition may include contiguous/localized and/or distributed PRUs. Each frequency partition may be used for a different purpose such as a fractional frequency reuse (FFR). In FIG. 3, the second frequency partition FP2 includes both continued resource allocation and distributed resource allocation. 'Sc' denotes subcarrier.

The PRU is a basic physical unit for resource allocation, including Psc number of contiguous subcarriers and Nsym number of contiguous OFDMA symbols. The Psc may be 18. The Nsym may be equal to the number of OFDMA symbols included in one subframe. Thus, Nsym may be determined according to the type of a subframe. For example, when a subframe includes six OFDMA symbols, the PRU may be defined to include 18 subcarriers and 6 OFDMA symbols.

A logical resource unit (LRU) is a basic logical unit for a distributed and continued resource allocation, and includes the Psc number of subcarriers and the Nsym number of OFDMA symbols. The size of the LRU for a transmission of a control channel is equal to the size of an LRU for a transmission of data. A plurality of users may share one control LRU. Also, the LRU may include pilot. Thus, an appropriate number of subcarriers in an LRU are dependent upon the number of allocated pilots and the presence of a control channel.

A distributed logical resource unit (DLRU) may be used to obtain a frequency diversity gain. The DLRU includes a group of distributed subcarriers in a frequency partition. The size of the DLRU is equal to that of a PRU. A minimum unit for forming a DLRU is tile, and the size of an uplink tile is 6 subcarriers*Nsym OFDMA symbols. Nsym may vary according to a subframe type.

A contiguous logical resource unit (CLRU) may be used to obtain a frequency selective scheduling gain. The CLRU includes a group of contiguous subcarriers. The size of a CLRU is equal to that of a PRU.

Hereinafter, a control channel for transmitting a control signal or a feedback signal will now be described. A control channel may be used to transmit various types of control signals for communication between a base station (BS) and a user equipment (UE). A control channel described hereinafter may be applied to an uplink control channel and a downlink control channel.

The control channel may be designed in consideration of the following points.

(1) A plurality of tiles included in a control channel may be distributed to a time domain or a frequency domain in order to obtain a frequency diversity gain. For example, when it is considered that a DLRU includes three tiles each including six contiguous subcarriers on six OFDM symbols, the control channel includes three tiles and the respective tiles may be distributed to the frequency domain or the time domain. Also, the control channel may include at least one tile, a tile may include a plurality of mini-tiles, and the mini-tiles may be distributed to the frequency domain or the time domain. For example, the mini-tiles may be configured as (OFDM symbols×subcarriers)=6×6, 3×6, 2×6, 1×6, 6×3, 6×2, 6×1, and the like. When it is assumed that a control channel including a tile having a PUSC structure of (OFDM symbols×subcarriers)= 3×4 of IEEE 802.16e is multiplexed according to an FDM (frequency division multiplexing) scheme, the mini-tiles may be configured as (OFDM symbols×subcarriers)=6×2, 6×1, or the like. Only when a control channel including mini-tiles is considered, the mini-tiles may be configured as (OFDM symbols×subcarriers)=6×2, 3×6, 2×6, 1×6, and the like.

(2) In order to support a high speed UE, the number of OFDM symbols constituting a control channel must be minimized. For example, three or less OFDM symbols constituting a control channel is appropriate to support a UE moving at 350 km/h.

(3) There is a limitation in transmission power per symbol of a UE, and in order to increase transmission power per symbol of the UE, a larger number of OFDM symbols constituting a control channel is advantageous. Thus, an appropriate number of OFDM symbols must be determined in consideration of transmission power per symbol of high speed UE of (2) and that of the UE of (3).

(4) For a coherent detection, pilot subcarriers for a channel estimation must be evenly distributed to the time domain or the frequency domain. The coherent detection is a method of obtaining data included in data subcarriers after performing channel estimation by using pilots. For boosting power of the pilot subcarriers, the number of pilots per OFDM symbol of the control channel must be equal to equally maintain transmission power per symbol.

(5) For a non-coherent detection, the control signal must be composed of an orthogonal code/sequence or a semi-orthogonal code/sequence, or may be spread.

The uplink control channel may include FFBCH (Fast Feedback Channel), HARQ feedback channel (HFBCH; Hybrid Automatic Repeat reQuest Feedback Channel), a ranging channel, BRCH (Bandwidth Request Channel), and the like. Information such as a CQI, a MIMO feedback, ACK/NACK, uplink synchronization signal, bandwidth request, and the like, may be transmitted via the uplink control channel. The FFBCH, the HFBCH, the ranging channel, the BRCH, and the like, may be positioned in any area in an uplink subframe or a frame.

The uplink control channel may be allocated through downlink control information transmitted through downlink from the BS. The downlink control information may be broadcasted to every UE or may be transmitted to each UE through a unicast service. The foregoing P-SFH or S-SFH is a broadcast downlink control signal, and a plurality of A-MAP IE (Advanced-MAP Information Element) may be defined as a basic element in controlling the unicast service.

Figure 4:
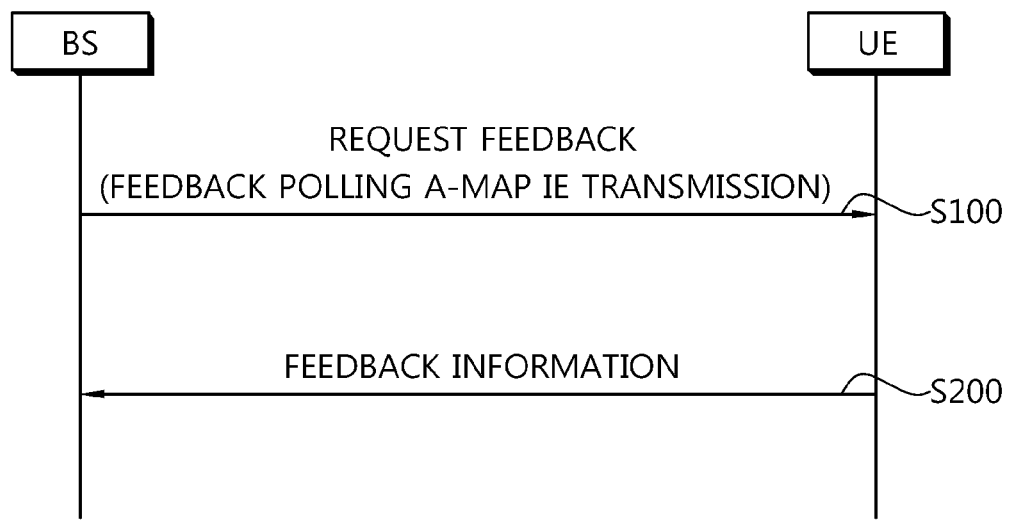
FIG. 4 illustrates a signaling process between a base station (BS) and a user equipment (UE) according to an exemplary embodiment of the present invention.

FIG. 4 illustrates a signaling process between a BS and a UE according to an exemplary embodiment of the present invention.

With reference to FIG. 4, the BS request feedback from the UE (S100). In order to schedule MIMO feedback transmission of the UE, the BS may transmit a feedback polling A-MAP IE among a plurality of A-MAP IEs to the UE. Namely, the BS may request the MIMO feedback (referred to as 'feedback', hereinafter) by transmitting the feedback polling A-MAP IE to the UE. In this case, the BS may unicast the feedback polling A-MAP IE to the UE. Then, the UE may transmit feedback information to the BS by using a MAC control message or a MAC signaling header according to content of the feedback polling A-MAP IE (S200).

Table 1 is an example of the conventional feedback polling A-MAP IE.

TABLE 1

| syntax | bits | content |
| --- | --- | --- |
| A-MAP IE Type | 4 | Feedback Polling A-MAP IE |
| Polling_sub_type | 1 | 0b0: uplink resource allocation or de-allocation. |
| | | 0b1: feedback mode allocation or de-allocation. |
| If (Polling_sub_type == 0b0){ | | |
|     Allocation Duration (d) | 3 | The allocation is valid for $2^{(d-1)}$ superframes starting from the superframe defined by allocation relevance. If d == 0b000, the pre-scheduled feedback header transmission is released. If d == 0b111, the pre-scheduled feedback header transmission shall be valid until the ABS commands to release it. |
|     If (d ==0b000) { | | Feedback de-allocation |
|         Resource Index | 11 | Confirmation of the resource index for a previously assigned persistent resource that has been deallocated<br>5 MHz: 0 in first 2 MSB bits + 9 bits for resource index<br>10 MHz: 11 bits for resource index<br>20 MHz: 11 bits for resource index<br>Resource index includes location and allocation size |
|     Polling_deallocation_bitmap | 3 | |
|     HFA | 6 | HARQ feedback channel allocation to acknowledge the successful detection of this IE. |
| } else if (d != 0b000){ | | Feedback allocation |
|     $I_{SizeOffset}$ | 5 | Offset used to compute burst size index |
|     Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size |
|     MEF | 2 | MIMO encoder format for uplink feedback transmission<br>Non-adaptive precoding shall be used at the AMS.<br>0b00: SFBC<br>0b01: Vertical encoding with $M_t = 2$, or $M_t = 1$ if AMS has 1 tranmsit antenna<br>0b10: CSM with TNS = 2, $M_t = 1$, SI = 1<br>0b11: CSM with TNS = 2, $M_t = 1$, SI = 2 |
|     Long TTI Indicator | 1 | Indicates number of AAI subframes spanned by the allocated resource.<br>0b0: AAI subframe (default)<br>0b1: 4 UL AAI subframes for FDD or all UL AAI subframes for TDD<br>If number of DL AAI subframes, D, is less than number of UL AAI subframes, U, Long TTI Indicator = 0b1 |
|     HFA | 3 | Index for HARQ Feedback Allocation |

TABLE 1-continued

| syntax | bits | content |
|---|---|---|
| ACID | 4 | HARQ channel identifier |
| MFM_allocation_index | 2 | 0b00: MFM 0 with Measurement Method Indication = 0<br>0b01: MFM 3 with all subbands<br>0b10: MFM 6 with all subbands<br>0b11: MFM is defined in Feedback Polling A-MAP IE with Polling_sub-type = 0b1 |
| MaxM$_t$ | 1~2 | |
| Period | 4 | Resource is allocated at frames designated by every short and long period. The short feedback period is p frames. The long feedback period is q superframes. The first allocation shall start two frames later. The AAI subframe index is defined as in 16.2.14.2.2 and the AAI frame index is given by i + 2, where i is the index of the frame where the Feedback Polling A-MAP IE is transmitted.<br>The feedback of MIMO feedback modes in MFM_allocation_index is allocated on the short period. The feedback of the transmit correlation matrix is allocated on the long period if q > 0.<br>Short and long period reports shall start at the first allocation. When short and long period feedback reports coincide in the same frame, both short period feedback content and long period feedback content shall be sent in the same burst.<br>0b0000: p = 1, q = 0<br>0b0001: p = 2, q = 0<br>0b0010: p = 4, q = 0<br>0b0011: p = 8, q = 0<br>0b0100: p = 16, q = 0<br>0b0101: p = 1, q = 1<br>0b0110: p = 2, q = 1<br>0b0111: p = 1, q = 2<br>0b1000: p = 2, q = 2<br>0b1001: p = 4, q = 2<br>0b1010: p = 1, q = 4<br>0b1011: p = 2, q = 4<br>0b1100: p = 4, q = 4<br>0b1101: p = 0, q = 1<br>0b1110: p = 0, q = 2<br>0b1111: p = 0, q = 4 |
| }<br>} else { | | Polling_sub_type == 0b1 |
| ACK Allocation Flag | 1 | |
| If (ACK Allocation Flag == 0b1) {  | | |
| HFA | 6 | HARQ feedback channel allocation to acknowledge the successful detection of this IE. |
| }<br>Allocation Duration (d) | 3 | The allocation is valid for $2^{(d-1)}$ superframes starting from the superframe defined by allocation relevance. If d = 0b000, the pre-scheduled feedback header transmission is released. If d == 0b111, the pre-scheduled feedback header transmission shall be valid until the BS commands to release it. |
| If (d == 0b000) { | | Feedback de-allocation |
| Polling_deallocation_bitmap | 3 | |
| } Else { | | Feedback allocation |
| MIMO_feedback_IE_type | 1 | 0b0: feedback allocation for single-BS MIMO operation<br>0b1: feedback allocation for multi-BS MIMO operation |
| If (MIMO_feedback_IE_type == 0b0){ | | Single-BS MIMO feedback request |
| MFM_bitmap | 8 | If a currently allocated MFM is indicated in the MFM_bitmap, it indicates a deallocation and reallocation of this MFM. ACK Allocation Flag shall be set to 0b1 in this case. |
| Period | 4 | 16 combination of short feedback period p (frames) and long feedback period q (superframes). The first report shall start two frames later. The AAI subframe index is defined as in 16.2.14.2.2 and the AAI frame index is given by i + 2, where i is the index of the frame where the Feedback Polling A-MAP IE is transmitted. The short period feedback shall be included in the first report. The long period feedback shall also be included in the first report if it is assigned. When short and long period feedback reports coincide in the same frame, both short period feedback content and long period feedback content shall be sent in the same burst.<br>0b0000: p = 1, q = 0<br>0b0001: p = 2, q = 0<br>0b0010: p = 4, q = 0 |

TABLE 1-continued

| syntax | bits | content |
|---|---|---|
| | | 0b0011: p = 8, q = 0 |
| | | 0b0100: p = 16, q = 0 |
| | | 0b0101: p = 1, q = 1 |
| | | 0b0110: p = 2, q = 1 |
| | | 0b0111: p = 1, q = 2 |
| | | 0b1000: p = 2, q = 2 |
| | | 0b1001: p = 4, q = 2 |
| | | 0b1010: p = 1, q = 4 |
| | | 0b1011: p = 2, q = 4 |
| | | 0b1100: p = 4, q = 4 |
| | | 0b1101: p = 0, q = 1 |
| | | 0b1110: p = 0, q = 2 |
| | | 0b1111: p = 0, q = 4 |
| If (LSB #0 in MFM_bitmap == 1){ | | MFM 0 |
| $MaxM_t$ | 1~2 | |
| Measurement Method Indication | 1 | 0b0: Use the midamble for CQI measurements<br>0b1: Use pilots in OL region with $MaxM_t$ streams for CQI measurements |
| }<br>If (LSB #1 in MFM_bitmap == 1){ | | MFM 1 |
| $MaxM_t$ | 2 | |
| Measurement Method Indication | 1 | 0b0: Reserved<br>0b1: Use pilots in OL region with $MaxM_t$ streams for CQI measurements |
| }<br>If (LSB #2 in MFM_bitmap == 1){ | | MFM 2 |
| $MaxM_t$ | 1~2 | |
| Num_best_subbands | 2 | 0b00: report all subbands<br>0b01: 1 best subband<br>0b10: min{6, $Y_{SB}$} best subbands<br>0b11: min{12, $Y_{SB}$} best subbands<br>1 < Num_best_subbands < $Y_{SB}$ |
| Measurement Method Indication | 1 | 0b0: Use the midamble for CQI measurements<br>0b1: Use pilots in OL region with $MaxM_t$ streams for CQI measurements |
| }<br>If (LSB #3 in MFM_bitmap == 1){ | | MFM 3 |
| $MaxM_t$ | 1~2 | |
| Num_best_subbands | 2 | 0b00: report all subbands<br>0b01: 1 best subband<br>0b10: min{6, $Y_{SB}$} best subbands<br>0b11: min{12, $Y_{SB}$} best subbands<br>1 ≤ Num_best_subbands ≤ $Y_{SB}$ |
| If (q == 0){ | | |
| Codebook_coordination | 1 | 0b0: base mode with codebook coordination disabled<br>0b1: base mode with codebook coordination enabled |
| }<br>If ($N_t$ == 4){ | | |
| Codebook_subset | 1 | 0b0: report PMI from the base codebook or transformed base codebook<br>0b1: report PMI from codebook subset or transformed codebook subset |
| }<br>}<br>If (LSB #4 in MFM_bitmap == 1){ | | MFM 4 |
| $MaxM_t$ | 1~2 | |
| If (q == 0){ | | |
| Codebook_coordination | 1 | 0b0: base mode with codebook coordination disabled<br>0b1: base mode with codebook coordination enabled |
| }<br>If ($N_t$ == 4){ | | |
| Codebook_subset | 1 | 0b0: report PMI from the base codebook<br>0b1: report PMI from the codebook subset |
| } | | |

TABLE 1-continued

| syntax | bits | content |
|---|---|---|
| } | | |
| If (LSB #5 in MFM_bitmap == 1){ | | MFM 5 |
|     MaxM$_t$ | 1~2 | |
|     Num_best_subbands | 2 | 0b00: report all subbands |
| | | 0b01: 1 best subband |
| | | 0b10: min{6, Y$_{SB}$} best subbands |
| | | 0b11: min{12, Y$_{SB}$} best subbands |
| | | 1 ≤ Num_best_subbands ≤ Y$_{SB}$ |
|     Measurement Method Indication | 1 | 0b0: Use the midamble for CQI measurements |
| | | 0b1: Use pilots in OL region with MaxM$_t$ streams for CQI measurements |
| } | | |
| If (LSB #6 in MFM_bitmap == 1){ | | MFM 6 |
|     MaxM$_t$ | 1~2 | |
|     Num_best_subbands | 2 | 0b00: report all subbands |
| | | 0b01: 1 best subband |
| | | 0b10: min{6, Y$_{SB}$} best subbands |
| | | 0b11: min{12, Y$_{SB}$} best subbands |
| | | 1 ≤ Num_best_subbands ≤ Y$_{SB}$ |
|     If (q == 0){ | | |
|     Codebook_coordination | 1 | 0b0: base mode with codebook coordination disabled |
| | | 0b1: base mode with codebook coordination enabled |
|     } | | |
|     If (N$_t$ == 4){ | | |
|     Codebook_subset | 1 | 0b0: report PMI from the base codebook or transformed base codebook |
| | | 0b1: report PMI from codebook subset or transformed codebook subset |
|     } | | |
| } | | |
| If (LSB #7 in MFM_bitmap == 1){ | | MFM 7 |
|     MaxM$_t$ | 1~2 | |
|     If (q == 0){ | | |
|     Codebook_coordination | 1 | 0b0: base mode with codebook coordination disabled |
| | | 0b1: base mode with codebook coordination enabled |
|     } | | |
|     If (N$_t$ == 4){ | | |
|     Codebook_subset | 1 | 0b0: report PMI from the base codebook |
| | | 0b1: report PMI from the codebook subset |
|     } | | |
| } | | |
| } Else { | | Multi-BS MIMO feedback request |
|     Period (p) | 3 | Transmit feedback header every 4 × p frames. The first report shall start at the next frame. |
|     TRU | 2 | Target RU indicating which RUs or which type of RU to work on for feedback |
| | | 0b00: Latest best subbands reported for single BS MIMO |
| | | 0b01: Whole bandwidth |
| | | 0b10: FFR partition 0 |
| | | 0b11: boosted FFR partition |
|     ICT | 2 | 0b00: PMI restriction for single-BS precoding; |
| | | 0b01: PMI recommendation for single-BS precoding; |
| | | 0b10: CL-MD for multi-BS precoding; |
| | | 0b11: Co-MIMO for multi-BS precoding; |
|     If (N$_t$ == 4){ | | |
|     Codebook_subset | 1 | 0b0: report PMI from the base codebook |
| | | 0b1: report PMI from the base codebook subset |
|     } | | |
|     N_multiBS_reports | 3 | N_multiBS_reports indicates the number of reports. |
|     If (ICT = 0b11) { | | |
|     MaxUser | 2 | Maximum number of users supported in Co-MIMO in the same resource. |
| | | 0b00: 2 users |
| | | 0b01: 3 users |
| | | 0b10: 4 users |
| | | 0b11: reserved |
|     } | | |

TABLE 1-continued

| syntax | bits | content |
|---|---|---|
| } | | |
| } | | |
| } | | |
| Padding | variable | Padding to reach byte boundary |
| } | | |

Respective fields (parameters) constituting the feedback polling A-MAP IE in Table 1 are defined as follows.

Polling_sub_type: It indicates an uplink resource allocation or de-allocation, or a feedback mode allocation or de-allocation. The 'Polling_sub_type' may be composed of one bit and set to be 0 or 1. When the 'Polling_sub_type' is set to be 0, a dedicated uplink (UL) allocation is included in the feedback polling A-MAP IE. The dedicated uplink allocation may be used to transmit feedback information in a feedback transmission frame defined in the feedback polling A-MAP IE. When the 'Polling_sub_type' is set to be 1, the feedback polling A-MAP IE does not include a dedicated UL allocation. In this case, the UE may transmit feedback information by using a dedicated UL allocation designated in a previous feedback polling A-MAP IE. Namely, the BS may inform the UE about whether to allocate uplink resource through a current feedback polling A-MAP IE or whether to perform feedback by using uplink resource which was allocated in the previous feedback polling A-MAP IE.

Allocation Duration (d): it indicates a valid interval of allocation. The allocation is valid for $2^{(d-1)}$ superframes starting from the superframe defined by allocation relevance. When the value 'd' is 0, it indicates feedback de-allocation, so a previously scheduled feedback header transmission is released. When the value 'd' is a binary number '111' (i.e., 7), it indicates feedback allocation, so the previously schedule feedback header transmission is valid until when a release command is received from the BS.

Resource Index: It confirms the resource index for a previously assigned persistent resource which has been de-allocated.

HFA: It allocates an HARQ feedback channel to acknowledge a successful reception of the feedback polling A-MAP IE.

$I_{sizeOffset}$: It indicates an offset value used to calculate a burst size index.

MEF: It informs about a MIMO encoder format for an uplink feedback transmission. Non-adaptive precoding may be used by a UE.

Long TTI Indicator: It indicates the number of AAI subframes spanned by the allocated resource.

HFA: It is an index for an HARQ feedback allocation

ACID: It is an HARQ channel identifier.

MFM_allocation_index: It is composed of 2 bits, and when it is '0b00', it indicates MFM 0 with measurement method indication=0. MFM stands for MIMO feedback mode, which can be referred to Table 2 (to be described). When it is '0b01', it indicates MFM 3 with all subbands, when it is '0b10', it indicates MFM 6 with all subbands, and when it is '0b11', MFM is defined in feedback polling A-MAP IE with polling_subtype=1.

Period: it indicates a short period (p frame) and a long period (q superframe) of feedback. When q is greater than 0, feedback information according to a MIMO feedback mode indicated in an MFM_allocation_index is allocated with a short period, and a correlation matrix is allocated with a long period.

MIMO_feedback_IE_type: It indicates whether or not it is a single BS MIMO feedback request or a multi-BS MIMO feedback request.

MFM_bitmap: It is composed of 8 bits and indicates a MIMO feedback mode (MFM).

MaxMt: It indicates a maximum rank of feedback (in case of a single user MIMO) or a reference rank (in case of a multi-user MIMO).

Num_best_subbands: It indicates the number of best subbands fed back according to a feedback mode.

Codebook_coordination: It indicates from which codebook elements a PMI (precoding matrix index) is to be searched.

Codebook_subset: It indicates whether to report PMI from a base codebook (or a transformed base codebook) or from a codebook subset (or a transformed codebook subset).

Measurement method indication: It indicates a midamble for CQI measurement (when the value of the measurement method indication is 0b0) or pilot (when the value of the measurement method indication is 0b1).

Table 2 below shows examples of the MIMO feedback modes (MFM) and MIMO transmission modes supported accordingly.

TABLE 2

| MIMO Feedback Mode (MFM) | Description | Feedback contents | Type of RU | Supported MIMO transmission mode |
|---|---|---|---|---|
| MFM 0 | OL SU MIMO SFBC/SM (Diversity) | 1. STC Rate 2. Wideband CQI | Diversity (DRU, Mini-band based CRU) | MIMO mode 0 and MIMO mode 1. Flexible adaptation between the two modes STC Rate = 1: SFBC CQI STC Rate 2: SM CQI In DRU: Mt = 2 for SM.In Miniband |

TABLE 2-continued

| MIMO Feedback Mode (MFM) | Description | Feedback contents | Type of RU | Supported MIMO transmission mode |
|---|---|---|---|---|
| | | | | based CRU: Mt >= 2 for SM |
| MFM 1 | OL SU MIMO SM (Diversity) | 1. STC Rate<br>2. Wideband CQI | Diversity (Mini-band based CRU) | MIMO mode 1 |
| MFM 2 | OL SU MIMO SM (localized) | 1. STC Rate<br>2. Subband CQI<br>3. Subband Selection | Localized (Subband based CRU, Mini-band based CRU) | MIMO mode 1 |
| MFM 3 | CL SU MIMO (localized) | 1. STC Rate<br>2. Subband CQI<br>3. Subband PMI<br>4. Subband selection<br>[5. Wideband PMI]<br>6. Wideband correlation Matrix | Localized (Subband based CRU, Mini-band based CRU) | MIMO mode 2 |
| MFM 4 | CL SU MIMO (Diversity) | 1. Wideband CQI<br>[2. Wideband PMI]<br>3. Wideband correlation Matrix | Diversity (Mini-band based CRU) | MIMO mode 2 (Mt = 1) |
| MFM 5 | OL MU MIMO (localized) | 1. Subband CQI<br>2. Subband Selection<br>3. Stream indicator | Localized (Subband based CRU, Mini-band based CRU) | MIMO mode 3 |
| MFM 6 | CL MU MIMO (localized) | 1. Subband CQI<br>2. Subband PMI<br>3. Subband Selection<br>[4. Wideband PMI]<br>5. Wideband correlation Matrix | Localized (Subband based CRU, Mini-band based CRU) | MIMO mode 4 |
| MFM 7 | CL MU MIMO (Diversity) | 1. Wideband CQI<br>[2. Wideband PMI]<br>3. Wideband correlation Matrix | Diversity (Mini-band based CRU) | MIMO mode 4 |

With reference to table 2, supported MIMO transmission modes differ according to respective MIMO feedback modes. For example, a MIMO feedback mode 0 supports an application of OL-SU (Open Loop-Single User) MIMO environment SFBC (Space-Frequency Block Code) and SM (Spatial Multiplexing) in a diversity permutation. The UE measures a wideband CQI for the SFBC and the SM, and reports a CQI and STC (Space Time Coding) rate to the BS.

A MIMO feedback mode 1 is used for an OL-SU CDR (conjugate data repetition) having an STC rate of ½ in the diversity permutation.

A MIMO feedback mode 2 is used for OL-SU SM for a frequency selective scheduling in a localized permutation. An STC rate indicates a preferred number of MIMO streams for SM. A subband CQI corresponds to a selected rank.

A MIMO feedback mode 3 supports a CL-SU (Closed Loop-Single User) MIMO environment in a localized permutation for a frequency selective scheduling.

A MIMO feedback mode 4 is used for a CL-SU MIMO using wideband beamforming. The UE feeds back a wideband CQI. The UE estimates the wideband CQI on the assumption of a short-term or long-term precoding of the BS according to a feedback period. The BS obtains channel state information through feedback of a correlation matrix or feedback of a wideband PMI.

A MIMO feedback mode 5 supports an OL-MU (Open Loop-Multi User) MIMO environment in a localized permutation for a frequency selective scheduling.

A MIMO feedback mode 6 is used for CL-MU (Closed Loop-Multi-User) MIMO in a localized permutation for a frequency selective scheduling. The UE selects a subband and feeds back a corresponding CQI and a subband PMI. A subband CQI refers to a CQI of an optimum PMI in a subband. In order to estimate a PMI in one subband, a rank 1 codebook (or a subset of the codebook) is used.

A MIMO feedback mode 7 supports a CL-MU MIMO environment in a diversity permutation using wideband beamforming.

When the BS transmits the foregoing feedback polling A-MAP IE to the UE, it includes a CRC (cyclic redundancy check) therein. The CRC may be composed of 16 bits, and the UE may detect an error through CRC. When the feedback polling A-MAP IE is configured to include the CRC bits, maximum bits which may be transmitted by the BS may be limited. For example, in IEEE 602.16m, the feedback polling A-MAP IE must be configured not to exceed a maximum 56 bits.

However, the foregoing conventional feedback polling A-MAP IE has the following problems.

1. When 'Polling_sub_type' is 0 (i.e., 0b0) and the 16 CRC bits are included, 56 bits is exceeded (in detail, it is transmitted by 58 bits).

2. When 'Polling_sub_type' is 1 (i.e., 0b1), 56 bits may be exceeded depending on how an 'MFM_bitmap' is set in case of a single BS MIMO feedback request. Thus, a configuration method for reducing overhead of the feedback polling A-MAP IE is required.

First, when 'Polling_sub_type' is 0, the following four methods may be considered.

First method: Deletion of MEF Field (Parameter)

The MEF field indicates a MIMO encoder format for an uplink feedback transmission and may be composed of 2 bits. SFBC (space-frequency block code), vertical encoding, CSM (collaborative spatial multiplexing), or the like, are represented according to the MEF field value. When 'Polling_sub_type' is 0, the MEF field may be excluded by limiting a MIMO encoder format for an uplink feedback transmission to only the SFBC or one antenna transmission. In this manner, the total number of bits of the feedback polling A-MAP IE may meet the limitation of 56 bits.

Second Method: Reduction in Number of Bits of MEF Field and Reduction of Resource Index to 10 Bits The MEF field is composed of 2 bits, and when the value is 2, it indicates a CSM having TNS=2, Mt=1 and SI=1, and when the value is 3, it indicates a CSM having TNS=2, Mt=1 and SI=2. Here, a TNS (total number of streams) is the total number of streams in an LRU for the CSM, Mt is the number of streams in a transmission according to Nt (the number of transmission antennas of the BS), and SI is a first pilot index for the CSM. In this case, the MEF field may be reduced to 1 bit by excluding the CSM option. Also, the resource index field may be reduced to 10 bits to meet the limitation of the total number of bits of the feedback polling A-MAP IE to 56 bits.

Third Method: the Use of 'Polling_Sub_Type=0' Only for Resource Allocation.

According to this method, the 'MFM_allocation_index' field, the 'MaxMt' field, and the 'Period' field may be removed, so the total number of bits of the feedback polling A-MAP IE can meet the limitation of 56 bits.

Fourth method: Removal of 'MaxMt' field and modification of 'MFM_allocation_index' field and 'Period' field Table 3 below shows an example of a modification of the 'MFM_allocation_index' field and the 'Period' field in the fourth method.

TABLE 3

| | | |
|---|---|---|
| MFM_allocation_index | 2 | 0b00: MFM 0 with Measurement Method Indication = 0 with MaxMt = 1<br>0b01: MFM 0 with Measurement Method Indication = 0 with MaxMt = 2<br>0b10: Covariance matrix feedback<br>0b11: MFM is defined in Feedback Polling AMAP IE with Polling_sub-type = 0b1 |
| Period (p) | 4 | Resource is allocated at frames designated by every period. The short feedback period is $2^p$ frames. The first allocation shall start two frames later. The AAI subframe index is defined as in 16.2.14.2.2 and the AAI frame index is given by i + 2, where i is the index of the frame where the Feedback Polling A-MAP IE is transmitted. |

With reference to table 3, when the value of 'MFM_allocation_index' field is '0b00', the measurement method indication is 0 and indicates a MIMO feedback mode (MFM) 0 having 'MaxMt'=1, when the value of 'MFM_allocation_index' field is '0b01', the measurement method indication is 0 and indicates a MIMO feedback mode 0 having 'MaxMt'=2, when the value of 'MFM_allocation_index' field is '0b10', it indicates a covariance matrix feedback, and when the value of 'MFM_allocation_index' field is '0b11', the MIMO feedback mode is defined when the value of 'Polling_sub_type' is 1.

The conventional feedback polling A-MAP IE in Table 1 includes the 'MFM_allocation_index', 'MaxMt', 'Period' fields. When the meaning of the 'MFM_allocation_index' field is modified as shown in Table 3, the 'MaxMt' field can be eliminated. Through this method, the limitation of 56 bits of the feedback polling A-MAP IE can be maintained.

Hereinafter, a method for limiting the total number of bits of the feedback polling A-MAP IE to be 56 bits or less when the value of the 'Polling_sub_type' field is 1 will now be described.

When the value of the 'Polling_sub_type' field is 1 and 'MIMO_feedback_IE_type' is 0 (namely, it means a feedback allocation for a single base station MIMO operation), the total number of bits of the feedback polling A-MAP IE may exceed 56 bits according to the setting of the 'MFM_bitmap'. For example, let assume that the value of the 'MFM_bitmap' field is '00110010'. Also, let assume that a first bit in the bit stream is LSB #0 and the last bit is LSB #7. Namely, it is the case in which the MIMO feedback modes 2, 3, and 6 are indicated through the 'MFM_bitmap'. Then, with reference to Table 1, the total number of bits to be transmitted by including the CRC in the conventional feedback polling A-MAP IE is 61 bits, exceeding 56 bits (5 bits are required for MFM 2, six bits are required for MFM 3, and six bits are required for an MFM 6, and in this case, the 'MaxMt', 'Num_best_subbands' field are included in each MFM).

In an effort to overcome this problem, a method for classifying and using parameters (which are called common parameters) which can be commonly used in at least one MIMO feedback mode, among parameters used the respective MIMO feedback modes, may be considered. The common parameters may be parameters commonly required for the UE to generate feedback information in a plurality of MIMO feedback modes.

Figure 5:
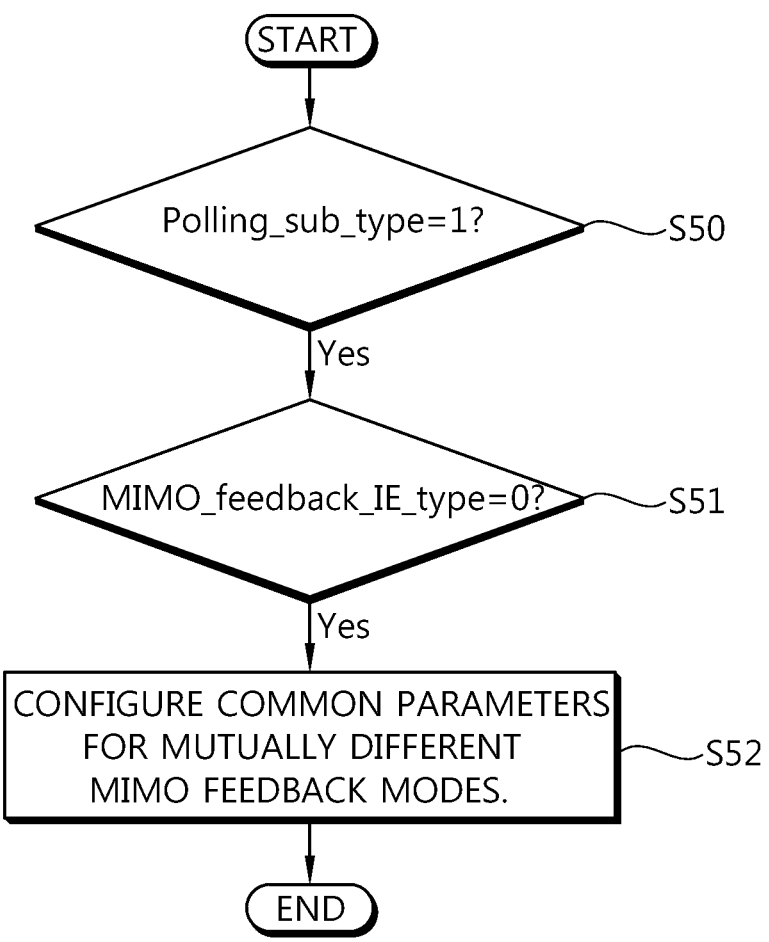
FIG. 5 is a flow chart illustrating a process of configuring a feedback polling A-MAP IE according to an exemplary embodiment of the present invention.

FIG. 5 is a flow chart illustrating a process of configuring a feedback polling A-MAP IE according to an exemplary embodiment of the present invention.

With reference to FIG. 5, when 'Polling_sub_type' is 1 (S50) and 'MIMO_feedback_IE_type' is 0 (S51), the BS uses common parameters (fields) for mutually different MIMO feedback modes (S53). When the common parameters are commonly used by a plurality of MFMs, rather than being separately included according to each MFM, the total number of bits of the feedback polling A-MAP IE can be reduced.

Table 4 below shows an example of the classification of the common parameters which can be commonly used according to MIMO feedback modes.

TABLE 4

| Parameter | MFM condition | Number of bits |
|---|---|---|
| MaxMt (for SU) | MFM0, MFM1, MFM2, MFM3 | 2 |
| MaxMt (for MU) | MFM4, MFM5, MFM6, MFM7 | 2 |
| Measurement Method Indication (OL) | MFM0, MFM1, MFM2, MFM5 | 1 |
| Num_best_subbands (localized) | MFM2, MFM3, MFM5, MFM6 | 2 |
| Codebook_cordination | MFM3, MFM4, MFM6, MFM7 | 1 |
| Codebook_subset | MFM3, MFM4, MFM6, MFM7 | 1 |

In Table 4, a 'Num_best_subbands' parameter (or field) is commonly included in MFMs 2, 3, 5, and 6. Namely, the Num_best_subbands' parameter may be a parameter indicating the number of subbands as targets of generation of channel status information when the MIMO feedback mode requests the channel status information based on subbands.

A 'Codebook_coordination' parameter and a 'Codebook_subset' parameter may be parameters indicating a codebook for selecting a PMI to be fed back by the UE when the MIMO feedback mode is a closed loop feedback mode.

According to the example in Table 4, the total number of bits of the common parameters commonly used in the plurality of MIMO feedback modes may be 9 bits. In this case, the total number of bits of the feedback polling A-MAP IE is 53 bits (MFM 1 can be used only in an OL region, and in this case, the 'MaxMt' and a measurement method have been already determined, so the 'measurement method indication' parameter may not be informed).

Table 5 below shows an example of a configuration of the feedback polling A-MAP IE when the parameters which can be commonly used for the plurality of MFMs as described above in Table 4 are employed and the fourth method are employed.

TABLE 5

| | | | |
|---|---|---|---|
| A-MAP IE Type | | 4 | Feedback Polling A-MAP IE |
| Polling_sub_type | | 1 | 0b0: uplink resource allocation or de-allocation. |
| | | | 0b1: feedback mode allocation or de-allocation. |
| If (Polling_sub_type == 0b0){ | | | |
| Allocation Duration (d) | | 3 | The allocation is valid for $2^{(d-1)}$ superframes starting from the superframe defined by allocation relevance. |
| | | | If d == 0b000, the pre-scheduled feedback header transmission is released. |
| | | | If d == 0b111, the pre-scheduled feedback header transmission shall be valid until the ABS commands to release it. |
| If (d ==0b000){ | | | Feedback de-allocation |
| Resource Index | | 11 | Confirmation of the resource index for a previously assigned persistent resource that has been deallocated |
| | | | 5 MHz: 0 in first 2 MSB bits + 9 bits for resource index |
| | | | 10 MHz: bits for resource index |
| | | | 20 MHz: 11 bits for resource index |
| | | | Resource index includes location and allocation size |
| Polling_deallocation_bitmap | | 3 | |
| HFA | | 6 | HARQ feedback channel allocation to acknowledge the successful detection of this IE. |
| } else if (d != 0b000) { | | | Feedback allocation |
| $I_{SizeOffset}$ | | 5 | Offset used to compute burst size index |
| Resource Index | | 11 | 5 MHz: 0 in first 2 MSB bits + 9 bits for resource index |
| | | | 10 MHz: 11 bits for resource index |
| | | | 20 MHz: 11 bits for resource index |
| | | | Resource index includes location and allocation size |
| MEF | | 2 | MIMO encoder format for uplink feedback transmission |
| | | | Non-adaptive precoding shall be used at the AMS. |
| | | | 0b00: SFBC |
| | | | 0b01: Vertical encoding with $M_t = 2$, or $M_t = 1$ if AMS has 1 tranmsit antenna |
| | | | 0b10: CSM with TNS = 2, $M_t = 1$, SI = 1 |
| | | | 0b11: CSM with TNS = 2, $M_t = 1$, SI = 2 |
| Long TTI Indicator | | 1 | Indicates number of AAI subframes spanned by the allocated resource. |
| | | | 0b0: AAI subframe (default) |
| | | | 0b1: 4 UL AAI subframes for FDD or all UL AAI subframes for TDD |
| | | | If number of DL AAI subframes, D, is less than number of UL AAI subframes, U, Long TTI Indicator = 0b1 |
| HFA | | 3 | Index for HARQ Feedback Allocation |
| ACID | | 4 | HARQ channel identifier |
| MFM_allocation_index | | 2 | 0b00: MFM 0 with Measurement Method Indication = 0 with MaxMt = 1 |
| | | | 0b01: MFM 0 with Measurement Method Indication = 0 with MaxMt = 2 |
| | | | 0b10: Covariance matrix feedback |
| | | | 0b11: MFM is defined in Feedback Polling AMAP IE with Polling_sub-type = 0b1 |
| Period (p) | | 4 | Resource is allocated at frames designated by every period. The short feedback period is $2^p$ frames. The first allocation shall start two frames later. The AAI subframe index is defined as in 16.2.14.2.2 and the AAI frame index is given by i + 2, where i is the index of the frame where the Feedback Polling A-MAP IE is transmitted. |
| } else { | | | Polling_sub_type == 0b1 |
| Allocation Duration (d) | | 3 | The allocation is valid for $2^{(d-1)}$ superframes starting from the superframe defined by allocation relevance. |
| | | | If d == 0b000, the pre-scheduled feedback header transmission is released. If d == 0b111. the pre-scheduled feedback header transmission shall be valid until the BS commands to release it. |
| ACK Allocation Flag | | 1 | |
| If (ACK Allocation Flag == 0b1){ | | | |
| HFA | | 6 | HARQ feedback channel allocation to acknowledge the successful detection of this IE. |
| } | | | |
| If (d == 0b000){ | | | Feedback de-allocation |
| Polling_deallocation_bitmap | | 3 | |
| } Else { | | | Feedback allocation |
| MIMO_feedback_IE_type | | 1 | 0b0: feedback allocation for single-BS MIMO operation |
| | | | 0b1: feedback allocation for multi-BS MIMO operation |
| If (MIMO_feedback_IE_type == | | | Single-BS MIMO feedback request |

TABLE 5-continued

| | | |
|---|---|---|
| 0b0){ | | |
|    MFM_bitmap | 8 | If a currently allocated MFM is indicated in the MFM_bitmap, it indicates a deallocation and reallocation of this MFM. ACK Allocation Flag shall be set to 0b1 in this case. |
|    Period | 4 | 16 combination of short feedback period p (frames) and long feedback period q (superframes). The first report shall start two frames later. The AAI subframe index is defined as in 16.2.14.2.2 and the AAI frame index is given by i + 2, where i is the index of the frame where the Feedback Polling A-MAP IE is transmitted.<br>The short period feedback shall be included in the first report. The long period feedback shall also be included in the first report if it is assigned. When short and long period feedback reports coincide in the same frame, both short period feedback content and long period feedback content shall be sent in the same burst.<br>0b0000: p = 1, q = 0<br>0b0001: p = 2, q = 0<br>0b0010: p = 4, q = 0<br>0b0011: p = 8, q = 0<br>0b0100: p = 16, q = 0<br>0b0101: p = 1, q = 1<br>0b0110: p = 2, q = 1<br>0b0111: p = 1, q = 2<br>0b1000: p = 2, q = 2<br>0b1001: p = 4, q = 2<br>0b1010: p = 1, q = 4<br>0b1011: p = 2, q = 4<br>0b1100: p = 4, q = 4<br>0b1101: p = 0, q = 1<br>0b1110: p = 0, q = 2<br>0b1111: p = 0, q = 4 |
|    If ((LSB #0 in MFM_bitmap == 1) \|\| (LSB #2 in MFM_bitmap == 1) \|\| (LSB #3 in MFM_bitmap == 1)){ | | SU-MIMO |
|       MaxM$_t$ | 1~2 | MaxM$_t$ for SU-MIMO |
|    } | | |
|    If ((LSB #4 in MFM_bitmap == 1) \|\| (LSB #5 in MFM_bitmap == 1) \|\| (LSB #6 in MFM_bitmap == 1) \|\| (LSB #7 in MFM_bitmap == 1)){ | | MU-MIMO |
|       MaxM$_t$ | 1~2 | MaxM$_t$ for MU-MIMO |
|    } | | |
|    If ((LSB #0 in MFM_bitmap == 1) \|\| (LSB #2 in MFM_bitmap == 1) \|\| (LSB #5 in MFM_bitmap == 1)){ | | Open loop |
|       Measurement Method Indication | 1 | 0b0: Use the midamble for CQI measurements<br>0b1: Use pilots in OL region with MaxM$_t$ streams for CQI measurements |
|    } | | |
|    If ((LSB #2 in MFM_bitmap == 1) \|\| (LSB #3 in MFM_bitmap == 1) \|\| (LSB #5 in MFM_bitmap == 1) \|\| (LSB #6 in MFM_bitmap == 1)){ | | Subband Mode |
|       Num_best_subbands | 2 | 0b00: report all subbands<br>0b01: 1 best subband<br>0b10: min{6, Y$_{SB}$} best subbands<br>0b11: min{12, Y$_{SB}$} best subbands<br>1 ≤ Num_best_subbands ≤ Y$_{SB}$ |
|    } | | |
|    If ((LSB #3 in MFM_bitmap == 1) \|\| (LSB #4 in MFM_bitmap == 1) \|\| (LSB #6 in MFM_bitmap == 1) \|\| (LSB #7 in MFM_bitmap == 1)){ | | Closed Loop |

TABLE 5-continued

```
    If (q == 0){
   Codebook_coordination        1     0b0: base mode with codebook coordination disabled
                                      0b1: base mode with codebook coordination enabled
    }
    If (N_t == 4){
   Codebook_subset              1     0b0: report PMI from the base codebook or transformed base codebook
                                      0b1: report PMI from codebook subset or transformed codebook subset
    }
  }
  } Else {                            Multi-BS MIMO feedback request
     Period (p)                 3     Transmit feedback header every 4 × p frames.
                                      The first report shall start at the next frame.
     TRU                        2     Target RU indicating which RUs or which type of RU to work on for
                                      feedback
                                      0b00: Latest best subbands reported for single BS MIMO
                                      0b01: Whole bandwidth
                                      0b10: FFR partition 0
                                      0b11: boosted FFR partition
     ICT                        2     0b00: PMI restriction for single-BS precoding;
                                      0b01: PMI recommendation for single-BS precoding;
                                      0b10: CL-MD for multi-BS precoding;
                                      0b11: Co-MIMO for multi-BS precoding;
     If (N_t == 4){
   Codebook_subset              1     0b0: report PMI from the base codebook
                                      0b1: report PMI from the base codebook subset
     }
   N_multiBS_reports            3     N_multiBS_reports indicates the number of reports.
     If (ICT = 0b11)
   {
        MaxUser                 2     Maximum number of users supported in Co-MIMO in the same resource.
                                      0b00: 2 users
                                      0b01: 3 users
                                      0b10: 4 users
                                      0b11: reserved
     }
   }
  }
 }
Padding                      variable  Padding to reach byte boundary
}
```

With reference to Table 5, when LSB #0, LSB #2, or LSB #3 in the 'MFM_bitmap' parameter is 1 (namely, in case of a single user MIMO with MFM 0, MFM 2, or MFM 3), the number of bits of the feedback polling A-MAP IE can be reduced by commonly using the 'MaxMt' parameter. Also, when LSB #2, LSB #3, LSB #5, or LSB #6 in the 'MFM_bitmap' parameter is 1 (namely, in case of a subband mode with MFM 2, MFM 3, MFM 5, or MFM 6), the number of bits of the feedback polling A-MAP IE can be reduced by commonly using the 'Num_best_subbands' parameter. Also, when LSB #3, LSB #4, LSB #6, or LSB #7 in the 'MFM_bitmap' parameter is 1 (namely, in case of the closed-loop feedback mode with MFM 3, MFM 4, MFM 6, or MFM 7), the number of bits of the feedback polling A-MAP IE can be reduced by commonly using the 'Codebook_coordination' and 'Codebook_subset' parameters.

In the example of Table 5, all the parameters of Table 4 are applied and the fourth method is applied for the sake of convenience, but the present invention is not limited thereto. That is, only some parameters such as 'Num_best_subbands', 'codebook_coordination', and 'codebook_subset', among the parameters of Table 4 can be used as common parameters.

Hereinafter, another example of maintaining the total number of bits of the feedback polling A-MAP IE as 56 bits will now be described. For example, the 'MaxMt' parameter can be commonly used according to whether or not the MIMO mode employing the MFM is an OL MU-MIMO or CL MU-MIMO. Namely, the MFMs having common characteristics commonly use the 'MaxMt' parameter, rather than separately including the 'MaxMt' parameter in all the MFMs, by using common characteristics of the MFMs indicated by the 'MFM_bitmap'.

Table 6 below shows an example of classifying parameters which can be commonly used, when the 'MaxMt' is used according to whether or not the MIMO mode is an OL MU-MIMO or CL MU-MIMO.

TABLE 6

| Parameter | MFM condition | Number of bits |
|---|---|---|
| MaxMt for SU | MFM0, MFM1, MFM2, MFM3 | 2 |
| MaxMt for OL MU | MFM5 | 2 |
| MaxMt for CL MU | MFM4, MFM6, MFM7 | 2 |
| Measurement Method (OL) | MFM0, MFM1, MFM2, MFM5 | 1 |
| NumBestSubband (localized) | MFM2, MFM3, MFM5, MFM6 | 2 |
| Codebook_Cordination | MFM3, MFM4, MFM6, MFM7 | 1 |
| Codebook_Subset | MFM3, MFM4, MFM6, MFM7 | 1 |

In such a case, the number of bits of the parameters which can be commonly used totals 11 bits, making the number of bits of the feedback polling A-MAP IE 55 bits. Thus, it does not exceed the limitation of 56 bits.

Table 7 below shows an example of a configuration of the feedback polling A-MAP IE by employing the common parameters of Table 6 and employing the fourth method.

TABLE 7

| Field | Size (bits) | Description |
|---|---|---|
| A-MAP IE Type | 4 | Feedback Polling A-MAP IE |
| Polling_sub_type | 1 | 0b0: uplink resource allocation or de-allocation.<br>0b1: feedback mode allocation or de-allocation. |
| If (Polling_sub_type == 0b0){ | | |
|   Allocation Duration (d) | 3 | The allocation is valid for $2^{(d-1)}$ superframes starting from the superframe defined by allocation relevance.<br>If d == 0b000, the pre-scheduled feedback header transmission is released.<br>If d == 0b111, the pre-scheduled feedback header transmission shall be valid until the ABS commands to release it. |
|   If (d ==0b000){ | | Feedback de-allocation |
|     Resource Index | 11 | Confirmation of the resource index for a previously assigned persistent resource that has been deallocated<br>5 MHz: 0 in first 2 MSB bits + 9 bits for resource index<br>10 MHz: 11 bits for resource index<br>20 MHz: 11 bits for resource index<br>Resource index includes location and allocation size |
|     Polling_deallocation_bitmap | 3 | |
|     HFA | 6 | HARQ feedback channel allocation to acknowledge the successful detection of this IE. |
|   } else if (d != 0b000) { | | Feedback allocation |
|     $I_{SizeOffset}$ | 5 | Offset used to compute burst size index |
|     Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size |
|     MEF | 2 | MIMO encoder format for uplink feedback transmission<br>Non-adaptive precoding shall be used at the AMS.<br>0b00: SFBC<br>0b01: Vertical encoding with $M_t = 2$, or $M_t = 1$ if AMS has 1 tranmsit antenna<br>0b10: CSM with TNS = 2, $M_t = 1$, SI = 1<br>0b11: CSM with TNS = 2, $M_t = 1$, SI = 2 |
|     Long TTI Indicator | 1 | Indicates number of AAI subframes spanned by the allocated resource.<br>0b0: AAI subframe (default)<br>0b1: 4 UL AAI subframes for FDD or all UL AAI subframes for TDD<br>If number of DL AAI subframes, D, is less than number of UL AAI subframes, U, Long TTI Indicator = 0b1 |
|     HFA | 3 | Index for HARQ Feedback Allocation |
|     ACID | 4 | HARQ channel identifier |
|     MFM_allocation_index | 2 | 0b00: MFM 0 with Measurement Method Indication = 0 with MaxMt = 1<br>0b01: MFM 0 with Measurement Method Indication = 0 with MaxMt = 2<br>0b10: Covariance matrix feedback<br>0b11: MFM is defined in Feedback Polling AMAP IE with Polling_sub-type = 0b1 |
|     Period (p) | 4 | Resource is allocated at frames designated by every period. The short feedback period is $2^p$ frames. The first allocation shall start two frames later. The AAI subframe index is defined as in 16.2.14.2.2 and the AAI frame index is given by i + 2, where i is the index of the frame where the Feedback Polling A-MAP IE is transmitted. |
| } else { | | Polling_sub_type == 0b1 |
|   Allocation Duration (d) | 3 | The allocation is valid for $2^{(d-1)}$ superframes starting from the superframe defined by allocation relevance.<br>If d == 0b000, the pre-scheduled feedback header transmission is released.<br>If d == 0b111, the pre-scheduled feedback header transmission shall be valid until the BS commands to release it. |
|   ACK Allocation Flag | 1 | |
|   If (ACK Allocation Flag == 0b1){ | | |
|     HFA | 6 | HARQ feedback channel allocation to acknowledge the successful detection of this IE. |
|   } | | |
|   If (d == 0b000){ | | Feedback de-allocation |
|   Polling_deallocation_bitmap | 3 | |
|   } Else { | | Feedback allocation |
|     MIMO_feedback_IE_type | 1 | 0b0: feedback allocation for single-BS MIMO operation<br>0b1: feedback allocation for multi-BS MIMO operation |
|     If (MIMO_feedback_IE_type == 0b0){ | | Single-BS MIMO feedback request |
|     MFM_bitmap | 8 | If a currently allocated MFM is indicated in the MFM_bitmap, it indicates a deallocation and reallocation of this MFM. ACK Allocation Flag shall be set to 0b1 in this case. |
|     Period | 4 | 16 combination of short feedback period p (frames) and long feedback period q (superframes). The first report shall start two frames later. The AAI subframe index is defined as in 16.2.14.2.2 and the AAI frame index is given by i + 2, where i is the index of the frame where the |

TABLE 7-continued

| | | |
|---|---|---|
| | | Feedback Polling A-MAP IE is transmitted.<br>The short period feedback shall be included in the first report. The long period feedback shall also be included in the first report if it is assigned. When short and long period feedback reports coincide in the same frame, both short period feedback content and long period feedback content shall be sent in the same burst.<br>0b0000: p = 1, q = 0<br>0b0001: p = 2, q = 0<br>0b0010: p = 4, q = 0<br>0b0011: p = 8, q = 0<br>0b0100: p = 16, q = 0<br>0b0101: p = 1, q = 1<br>0b0110: p = 2, q = 1<br>0b0111: p = 1, q = 2<br>0b1000: p = 2, q = 2<br>0b1001: p = 4, q = 2<br>0b1010: p = 1, q = 4<br>0b1011: p = 2, q = 4<br>0b1100: p = 4, q = 4<br>0b1101: p = 0, q = 1<br>0b1110: p = 0, q = 2<br>0b1111: p = 0, q = 4 |
| If ((LSB #0 in MFM_bitmap == 1) \|\|<br>(LSB #2 in MFM_bitmap == 1) \|\|<br>(LSB #3 in MFM_bitmap == 1)){ | | SU-MIMO |
| MaxM$_t$ | 1~2 | MaxM$_t$ for SU-MIMO |
| }<br>If ((LSB #4 in MFM_bitmap == 1) \|\|<br>(LSB #6 in MFM_bitmap == 1) \|\|<br>(LSB #7 in MFM_bitmap == 1)){ | | CL MU-MIMO |
| MaxM$_t$ | 1~2 | MaxM$_t$ for CL MU-MIMO |
| }<br>If (LSB #5 in MFM_bitmap == 1) { | | OL MU-MIMO |
| MaxM$_t$ | 1~2 | MaxM$_t$ for OL MU-MIMO |
| }<br>If ((LSB #0 in MFM_bitmap == 1) \|\|<br>(LSB #2 in MFM_bitmap == 1) \|\|<br>(LSB #5 in MFM_bitmap == 1)){ | | Open loop |
| Measurement Method Indication | 1 | 0b0: Use the midamble for CQI measurements<br>0b1: Use pilots in OL region with MaxM$_t$ streams for CQI measurements |
| }<br>If ((LSB #2 in MFM_bitmap == 1) \|\|<br>(LSB #3 in MFM_bitmap == 1) \|\|<br>(LSB #5 in MFM_bitmap == 1) \|\|<br>(LSB #6 in MFM_bitmap == 1)){ | | Subband Mode |
| Num_best_subbands | 2 | 0b00: report all subbands<br>0b01: 1 best subband<br>0b10: min{6, Y$_{SB}$} best subbands<br>0b11: min{12, Y$_{SB}$} best subbands<br>1 ≤ Num_best_subbands ≤ Y$_{SB}$ |
| }<br>If ((LSB #3 in MFM_bitmap == 1) \|\|<br>(LSB #4 in MFM_bitmap == 1) \|\|<br>(LSB #6 in MFM_bitmap == 1) \|\|<br>(LSB #7 in MFM_bitmap == 1)){<br>If (q == 0){ | | Closed Loop |
| Codebook_coordination | 1 | 0b0: base mode with codebook coordination disabled<br>0b1: base mode with codebook coordination enabled |
| } | | |

TABLE 7-continued

| | | |
|---|---|---|
| If ($N_t == 4$){ | | |
| Codebook_subset | 1 | 0b0: report PMI from the base codebook or transformed base codebook |
| | | 0b1: report PMI from codebook subset or transformed codebook subset |
| } | | |
| } | | |
| } Else { | | Multi-BS MIMO feedback request |
| Period (p) | 3 | Transmit feedback header every 4 × p frames. |
| | | The first report shall start at the next frame. |
| TRU | 2 | Target RU indicating which RUs or which type of RU to work on for feedback |
| | | 0b00: Latest best subbands reported for single BS MIMO |
| | | 0b01: Whole bandwidth |
| | | 0b10: FFR partition 0 |
| | | 0b11: boosted FFR partition |
| ICT | 2 | 0b00: PMI restriction for single-BS precoding; |
| | | 0b01: PMI recommendation for single-BS precoding; |
| | | 0b10: CL-MD for multi-BS precoding; |
| | | 0b11: Co-MIMO for multi-BS precoding; |
| If ($N_t == 4$){ | | |
| Codebook_subset | 1 | 0b0: report PMI from the base codebook |
| | | 0b1: report PMI from the base codebook subset |
| } | | |
| N_multiBS_reports | 3 | N_multiBS_reports indicates the number of reports. |
| If (ICT = 0b11) | | |
| { | | |
| MaxUser | 2 | Maximum number of users supported in Co-MIMO in the same resource. |
| | | 0b00: 2 users |
| | | 0b01: 3 users |
| | | 0b10: 4 users |
| | | 0b11: reserved |
| } | | |
| } | | |
| } | | |
| } | | |
| Padding | variable | Padding to reach byte boundary |
| } | | |

Figure 6:
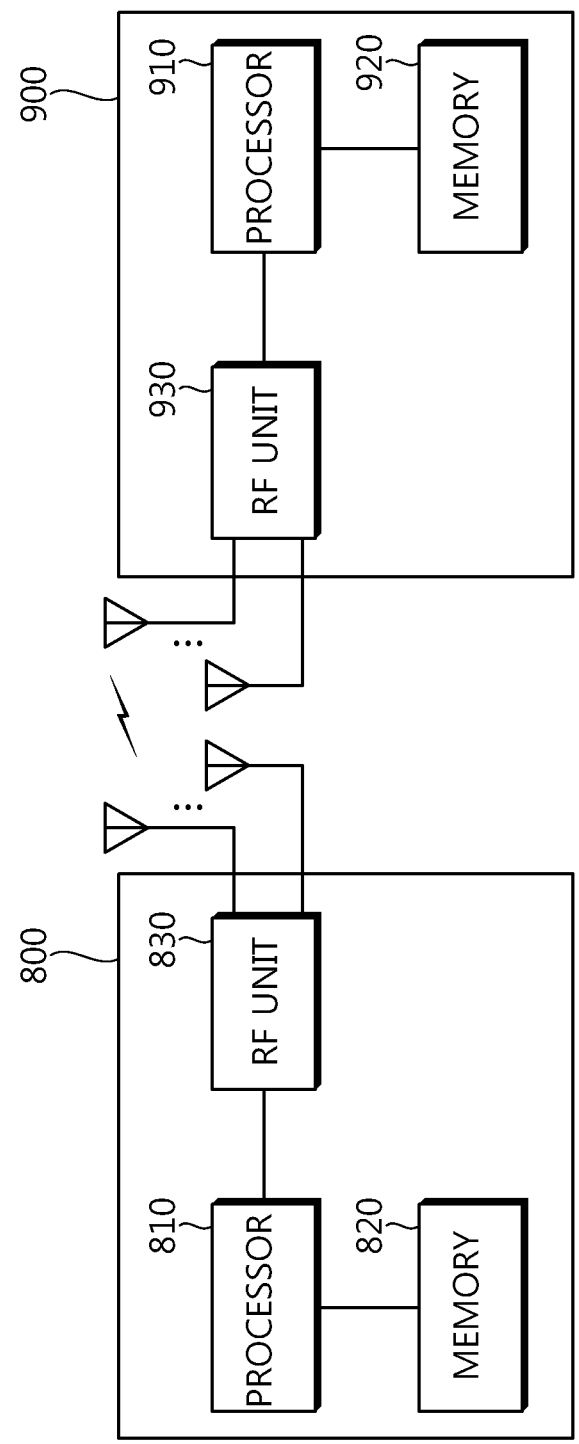
FIG. 6 is a schematic block diagram of a BS and a UE according to an exemplary embodiment of the present invention.

FIG. 6 is a schematic block diagram of a BS and a UE according to an exemplary embodiment of the present invention.

The BS 800 includes a processor 810, a memory 820, and an RF (radio frequency) unit 830. The processor 810 implements the proposed functions, processes, and/or methods. The processor 810 generates feedback request control information, e.g., a feedback polling A-MAP IE, and transmits the same to the UE 900 through the RF unit 830. The feedback polling A-MAP IE includes a MIMO feedback bitmap indicating at least one MIMO feedback mode and common parameters to be applied to the UE 900. The common parameters may be parameters commonly required for the UE 900 to generate feedback information in at least one MIMO feedback mode. Layers of a radio interface protocol may be implemented by the processor 810. The memory 820, connected to the processor 810, stores various types of information for driving the processor 810. The RF unit 830, connected to the processor 810, transmits and/or receives radio signals, and transmits the feedback polling A-MAP IE.

The UE 900 includes a processor 910, a memory 920, and an RF unit 930. The RF unit 930, connected to the processor 910, receives the feedback polling A-MAP IE from the BS 800 and transmits a feedback signal. The processor 910 implements the proposed functions, processes, and/or methods. The processor 910 processes the feedback polling A-MAP IE and generates feedback information. Layers of a radio interface protocol may be implemented by the processor 910. The memory 920, connected to the processor 910, stores various types of information for driving the processor 910.

The processors 810 and 910 may include an ASIC (application-specific integrated circuit), a different chipset, logic circuit, and/or a data processing device. The memories (820, 920) may include a ROM (read-only memory), a RAM (random access memory), a flash memory, a memory card, a storage medium, and/or other storage devices. The RF units 830 and 930 may include a baseband circuit for processing a radio signal. When an embodiment is implemented by software, the foregoing scheme may be implemented with modules (processes, functions, etc.) performing the foregoing functions. The modules may be stored in the memories 820 and 920 and executed by the processors 810 and 910. The memories 820 and 920 may be disposed within or outside the processors 810 and 910 or may be connected to the processors 810 and 910 through a well known unit.

According to exemplary embodiments of the present invention, overhead of a feedback request transmitted by a BS can be reduced, and the feedback request can be maintained within the limited number of bits prescribed in a system.

In the foregoing exemplary system, the methods are described based on the flow chart as sequential steps or blocks, but the present invention is not limited to the order of the steps and some of them may be performed in order different from the order of the foregoing steps or simultaneously. Also, a skilled person in the art will understand that the steps are not exclusive but may include other steps, or one or more steps of the flow chart may be deleted without affecting the scope of the present invention.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for transmitting a feedback request in a wireless communication system, the method performed by a base station (BS) and comprising:

transmitting feedback request control information to a user equipment (UE), wherein the feedback request control information includes a MIMO (Multi-Input Multi-Output) feedback bitmap and common parameters, the MIMO feedback bitmap indicating at least one MIMO feedback mode to be applied to the UE among 8 different MIMO feedback modes, wherein the 8 different MIMO feedback modes are classified as including 4 closed loop (CL) MIMO feedback modes used for a closed loop feedback and 4 open loop (OL) MIMO feedback modes used for an open loop feedback and the 8 different MIMO feedback modes are also classified as including 4 subband channel quality indicator (CQI) MIMO feedback modes requesting a subband CQI and 4 wideband CQI MIMO feedback modes requesting a wideband CQI, wherein the common parameters included in the feedback request control information are the same for at least two MIMO feedback modes among the 8 different MIMO feedback modes, wherein the common parameters comprise a parameter regarding a codebook for selecting a precoding matrix index (PMI) to be fed back by the UE when the MIMO feedback bitmap indicates at least one of the 4 CL MIMO feedback modes, and wherein the common parameters comprise a parameter indicating a number of subbands as targets for generating a subband CQI when the MIMO feedback bitmap indicates at least one of the 4 subband CQI MIMO feedback modes.

2. The method of claim 1, wherein the feedback request control information is unicasted to the UE.

3. The method of claim 1, wherein the MIMO feedback bitmap comprises 8 bits.

4. The method of claim 1, wherein the feedback request control information comprises 16-bit cyclic redundancy check (CRC).

5. A method for receiving a feedback request of a user equipment (UE) in a wireless communication system, the method comprising:

receiving feedback request control information from a base station (BS); and transmitting feedback information to the BS based on the feedback request control information, wherein the feedback request control information includes a MIMO (Multi-Input Multi-Output) feedback bitmap and common parameters, the MIMO feedback bitmap indicating at least one MIMO feedback mode to be applied to the UE among 8 different MIMO feedback modes, wherein the 8 different MIMO feedback modes are classified as including 4 closed loop (CL) MIMO feedback modes used for a closed loop feedback and 4 open loop (OL) MIMO feedback modes used for an open loop feedback, wherein the 8 different MIMO feedback modes are also classified as including 4 subband channel quality indicator (CQI) MIMO feedback modes requesting a subband CQI and 4 wideband CQI MIMO feedback modes requesting a wideband CQI, wherein the common parameters included in the feedback request control information are the same for at least two MIMO feedback modes among the 8 different MIMO feedback modes, wherein the common parameters comprise a parameter regarding a codebook for selecting a precoding matrix index (PMI) to be fed back by the UE when the MIMO feedback bitmap indicates at least one of the 4 CL MIMO feedback modes, and wherein the common parameters comprise a parameter indicating a number of subbands as targets for generating a subband CQI when the MIMO feedback bitmap indicates at least one of the 4 subband CQI MIMO feedback modes.

6. The method of claim 5, wherein the feedback request control information is unicasted from the BS to the UE.

7. The method of claim 5, wherein the MIMO feedback bitmap comprises 8 bits.

8. The method of claim 5, wherein the feedback request control information comprises 16-bit cyclic redundancy check (CRC).

9. An apparatus for transmitting a feedback request in a wireless communication system, the apparatus comprising:

a radio frequency (RF) unit configured to transmit and receive a radio signal; and a processor connected to the RF unit and configured to cause the RF unit to transmit feedback request control information to a user equipment (UE), wherein the feedback request control information includes a MIMO (Multi-Input Multi-Output) feedback bitmap and common parameters, the MIMO feedback bitmap indicating at least one MIMO feedback mode to be applied to the UE among 8 different MIMO feedback modes, wherein the 8 different MIMO feedback modes are classified as including 4 closed loop (CL) MIMO feedback modes used for a closed loop feedback and 4 open loop (OL) MIMO feedback modes used for an open loop feedback, wherein the 8 different MIMO feedback modes are also classified as including 4 subband channel quality indicator (CQI) MIMO feedback modes requesting a subband CQI and 4 wideband CQI MIMO feedback modes requesting a wideband CQI, wherein the common parameters included in the feedback request control information are the same for at least two MIMO feedback modes among the 8 different MIMO feedback modes, wherein the common parameters comprise a parameter regarding a codebook for selecting a precoding matrix index (PMI) to be fed back by the UE when the MIMO feedback bitmap indicates at least one of the 4 CL MIMO feedback modes, and wherein the common parameters comprise a parameter indicating a number of subbands as targets for generating a subband CQI when the MIMO feedback bitmap indicates at least one of the 4 subband CQI MIMO feedback modes.

10. An apparatus for receiving a feedback request in a wireless communication system, the apparatus comprising:

a radio frequency (RF) unit configured to transmit and receive a radio signal; and a processor connected to the RF unit and configured to cause the RF unit to receive feedback request control information, wherein the feedback request control information includes a MIMO (Multi-Input Multi-Output) feedback bitmap and common parameters, the MIMO feedback bitmap indicating at least one MIMO feedback mode to be applied to a user equipment (UE) among 8 different MIMO feedback modes, wherein the 8 different MIMO feedback modes are classified as including 4 closed loop (CL) MIMO feedback modes used for a closed loop feedback and 4 open loop (OL) MIMO feedback modes used for an open loop feedback, wherein the 8 different MIMO feedback modes are also classified as including 4 subband channel quality indicator (CQI) MIMO feedback modes requesting a subband CQI and 4 wideband CQI MIMO feedback modes requesting a wideband CQI, wherein the common parameters included in the feedback request control information are the same for at least two MIMO feedback modes among the 8 different MIMO feedback modes, wherein the common parameters comprise a parameter regarding a codebook for selecting a precoding matrix index (PMI) to be fed back when the MIMO feedback bitmap indicates at least one of the 4 CL MIMO feedback modes, and wherein the common parameters comprise a parameter indicating a number of subbands as targets for generating a subband CQI when the MIMO feedback bitmap indicates at least one of the 4 subband CQI MIMO feedback modes.

* * * * *